United States Patent
O'Connell

[11] Patent Number: 5,991,882
[45] Date of Patent: Nov. 23, 1999

[54] AUTOMATED PASSWORD RESET

[75] Inventor: Ellen R. O'Connell, Plano, Tex.

[73] Assignee: Electronic Data Systems Corporation, Plano, Tex.

[21] Appl. No.: 08/908,302

[22] Filed: Aug. 7, 1997

Related U.S. Application Data

[63] Continuation of application No. 08/656,738, Jun. 3, 1996, abandoned.

[51] Int. Cl.$^6$ ..................................... G06F 13/00
[52] U.S. Cl. ........................................... 713/201
[58] Field of Search ..................... 395/186, 187.01, 395/188.01, 609, 244, 218, 490, 491; 380/1.59, 3, 4, 23, 25; 711/163, 164; 705/18, 44; 707/9; 713/200, 201, 202

[56] References Cited

U.S. PATENT DOCUMENTS

| | | | |
|---|---|---|---|
| 5,073,930 | 12/1991 | Green et al. ............................ | 380/10 |
| 5,280,581 | 1/1994 | Bathrick et al. ....................... | 395/200 |
| 5,420,926 | 5/1995 | Low et al. ............................. | 380/24 |
| 5,606,663 | 2/1997 | Kadooka ............................... | 395/188.01 |
| 5,610,981 | 3/1997 | Mooney et al. ........................ | 380/25 |
| 5,611,048 | 3/1997 | Jacobs et al. ......................... | 395/200.09 |
| 5,719,560 | 2/1998 | Watkins ................................ | 340/825.34 |
| 5,719,941 | 2/1998 | Swift et al. ........................... | 380/25 |
| 5,729,730 | 3/1998 | Wlaschin et al. ...................... | 395/603 |
| 5,734,718 | 3/1998 | Prafullchandra ....................... | 380/4 |
| 5,778,065 | 7/1998 | Hauser et al. ......................... | 380/21 |
| 5,835,100 | 11/1998 | Matsufasa ............................. | 345/467 |

FOREIGN PATENT DOCUMENTS 0 647 895 A1 4/1995 European Pat. Off. .......... G06F 1/00

OTHER PUBLICATIONS

IBM Technical Disclosure Bulletin, vol. 37, No. 1, Jan. 1, 1994, p. 25, entitled "Network Password Reset Application".
Computer Journal, vol. 36, No. 3, Jan. 1, 1993, pp. 227–237, Zviran, M., et al. entitled "A Comparison of Password Techniques for Multilevel Authentication Mechanisms".

Primary Examiner—Robert W. Beausoliel, Jr.
Assistant Examiner—Pierre Eddy Elisca
Attorney, Agent, or Firm—L. Joy Griebenow; Baker & Botts L.L.P.

[57] ABSTRACT

An automated system (10) is provided for resetting a computing system user's log-in password. The automated system (10) includes a database (16) which stores at least one question and corresponding answer received from the user. In response to a request for password reset received from the user, an interface (12) displays the stored question(s), thereby prompting the user to input an answer to each displayed question. A processor (14) is coupled to the database (16) and the interface (12). The processor (14) determines whether each input answer is the same as the stored corresponding answer. If the answers are the same, the processor (14) automatically resets the user's log-in password.

16 Claims, 3 Drawing Sheets

AUTOMATED PASSWORD RESET QUESTION/ANSWER ENTRY

QUESTION #1: What is my mother's maiden name?
ANSWER #1: ***    VERIFY ANSWER #1: ***

QUESTION #2: What was my first car?
ANSWER #2: ****   VERIFY ANSWER #2: ****

QUESTION #3: What was my high school's mascot?
ANSWER #3: **     VERIFY ANSWER #3: **

QUESTION #4: What is my favorite color?
ANSWER #4: ***    VERIFY ANSWER #4: ***

QUESTION #5: What is the diving speed of a laden swallow?
ANSWER #5:        VERIFY ANSWER #5:

PF1/13 = HELP    PF3/15 = MENU
PLEASE COMPLETE ALL FIELDS, THEN PRESS [ENTER]

*FIG. 3*

AUTOMATED PASSWORD RESET USER VERIFICATION

You have chosen to activate APR. This feature requires correct answers for two personal questions to verify your identity.

Once the correct answers are entered, the Security Screen is displayed for you to enter a new password. When the new password is verified, the password is reset and the Log-On Screen is presented.

The questions are asked one at a time. If two incorrect answers are entered, further APR attempts at password reset are prevented. Contact Information Security if this happens.

LOGON ID: JDOE
QUESTION: What was my first car?
ANSWER:   _____

PLEASE RESPOND TO THE QUESTION ABOVE, THEN PRESS [ENTER]

*FIG. 4*

AUTOMATED PASSWORD RESET

This application is continuation of application Ser. No. 08/656,738, filed Jun. 3, 1996, now abandoned.

TECHNICAL FIELD OF THE INVENTION

This invention relates generally to the field of computing systems, and more specifically to an automated password reset in a computing system.

BACKGROUND OF THE INVENTION

Many computing systems contain proprietary or sensitive information, and thus require that users enter a log-in password in order to access the systems. Preferably, no one should know a user's password except the user. Previously, if a user forgot his or her password, the user was required to contact a security officer in order to reset the password. This prior method of resetting a password was problematic for several reasons.

For security, a security officer needed to verify a user's identity before resetting the user's password. In many cases, the only way a security officer could verify the user's identity was to query the user using information, such as a social security number, available to the security officer. This information would often be readily available to or known by other people as well. Thus, a person having a knowledge of a user's name and such other information could fraudulently obtain access to a computing system.

Furthermore, the process was inefficient because a security officer was required to manually reset a user's password. In addition, because the security officer assigned a new password to the user during the reset process, the security officer was given knowledge of the user's password. Consequently, after receiving a new password from the security officer, the user was required to change the password again so that it would not be known to the security officer.

SUMMARY OF THE INVENTION

In accordance with the present invention, the disadvantages and problems associated with resetting a computing system user's log-in password have been substantially reduced or eliminated.

In accordance with one embodiment of the present invention, an automated method for resetting a computing system user's log-in password includes storing at least one question and corresponding answer received from a user. In response to a request for a password reset, the stored question is displayed to the user, thereby prompting the user to input an answer. If it is determined that the input answer is the same as the stored corresponding answer, the user's log-in password is reset.

In accordance with another embodiment of the present invention, an automated system is provided for resetting a computing system user's log-in password. The automated system includes a database which stores at least one question and corresponding answer received from the user. In response to a request for password reset received from the user, an interface displays the stored question, thereby prompting the user to input an answer. A processor is coupled to the database and the interface. The processor determines whether the input answer is the same as the stored corresponding answer. If the answers are the same, the processor resets the user's log-in password.

Important technical advantages of the present invention include automatically resetting a log-in password at a user's request. Each user of a computing system may input information, which is then stored in a database. If a user forgets his or her password, the information is retrieved from the database and used to verify the user's identity. After verification, the user's password is automatically reset. Consequently, a security officer is not required to manually reset the password.

Another important technical advantage of the present invention includes verifying a user's identity with information formulated by the user. In other words, each user decides what information will be used to verify his or her identity. The information, which can be personal to the user, is maintained in a database and retrieved when password reset is requested. Because the information is formulated by the user, the user is less likely to forget such information. Furthermore, because the information can be personal, it is less likely to be available to or generally known by people other than the user. Consequently, the process of resetting a password is made more secure.

Other important technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which:

FIG. 3 illustrates an exemplary question and answer input screen generated by the system shown in FIG. 1;

is FIG. 4 illustrates an exemplary user verification screen generated by the system shown in FIG. 1;

DETAILED DESCRIPTION OF THE INVENTION

The preferred embodiment of the present invention and its advantages are best understood by referring to FIGS. 1–6 of the drawings, like numerals used for like and corresponding parts of the various drawings.

Figure 1:
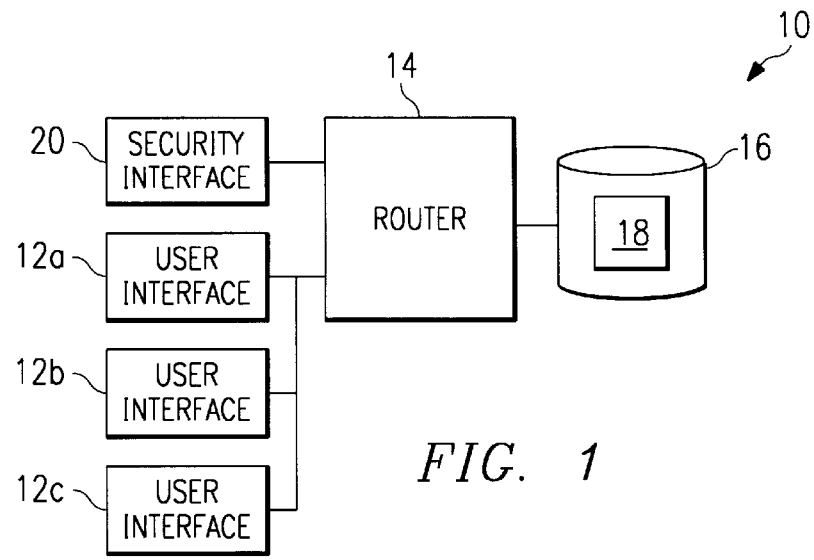
FIG. 1 illustrates an exemplary system for automatically resetting a user's password according to an embodiment of the present invention.

FIG. 1 illustrates an exemplary system 10 for automatically resetting a password for a user of a computing system. System 10 includes one or more user interfaces 12a–12c. The functionality of each user interface 12 may be performed by one or more suitable input devices, such as a keypad, touch screen, or other device that can accept information, and one or more suitable output devices, such as a computer display, for conveying information associated with the operation of system 10, including digital data, visual information, or audio information. Interfaces 12a–12c can be accessed by one or more users for inputting and retrieving information. For each user, this information includes password reset information 18, which can be used to reset the user's password.

A password reset information memory 16, which may be a relational database, receives and stores password reset information 18. Password reset information memory 16 can reside in a suitable storage medium, such as RAM, ROM, disk, tape storage, or other suitable volatile or non-volatile data storage system.

The password reset information 18, input at interface 12 and stored in password reset information memory 16, comprises information which can be used to automatically reset a user's password. For each user, password reset information 18 may include the user's name or log-on identification (ID), and information for verifying the user's identity. The verification information can be in the form of one or more questions and corresponding answers formulated by the user. A separate set of questions and answers can be received for each user. Exemplary questions include: "What is the name of my dog?"; "Where does my best friend from college now live?"; and "What is my favorite color?" Because these questions can be personal, the answers may not be readily available to or known by other people. Furthermore, for any question, the user can formulate an answer that is factually incorrect. For example, if a user attended the University of California at Los Angeles but always wished that she could have attended the University of Michigan, the user may input "University of Michigan" as an answer to the question "Where did I attend college?" Consequently, the process of resetting a password is made more secure because such verification information is not readily available from any records. The password reset information 18 may be stored in the form of a separate file for each user, such files comprising the name/log-on ID of the user and the verification questions and answers input by such user.

A router 14 is coupled to interface 12 and password reset memory 16. The functionality of router 14 may be performed by a processor, such as a main-frame, file server, work station, or any other suitable data processing facility. Router 14 receives password reset information 18 from any of user interfaces 12a–12c and routes such information to password reset memory 16 for storage. Router 14 also functions to determine whether the automated process for resetting a password has been invoked by any user. If so, router 14 retrieves the password reset information 18 for resetting the user's password.

In one embodiment, router 14 randomly selects one or more of the questions previously input by the user in order to verify the user's identity. Router 14 is also operable to determine whether any answer input in response to a selected question is the same as the stored answer corresponding to the question.

A security interface 20 is also coupled to router 14. Like user interfaces 12a–12c, the functionality of security interface 20 may be performed by one or more suitable input devices, such as a keypad, touch screen, or other device that can accept information, and one or more suitable output devices, such as a computer display, or other device that can output or convey information. Security interface 20 can function to display password reset information 18 to a security officer so that the officer can verify the identity of a user and manually reset the password in some instances.

Figure 2:
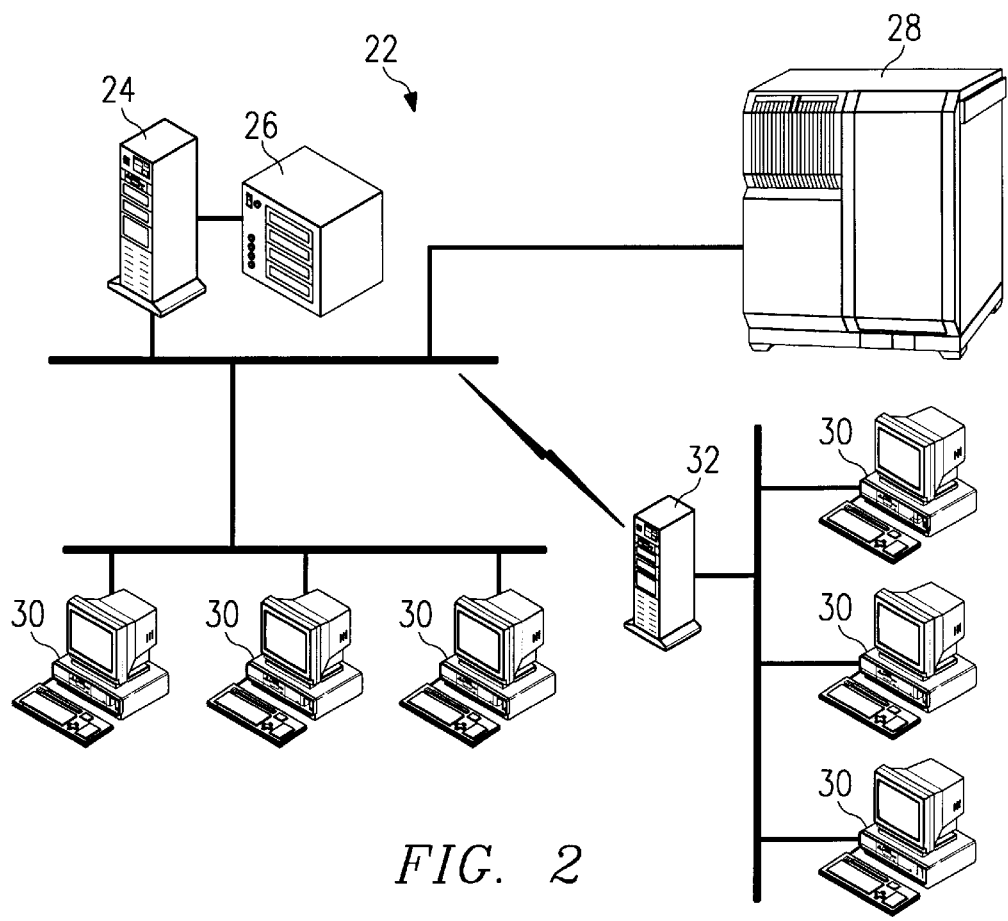
FIG. 2 illustrates an exemplary computer-based system that can be used to implement the automated password reset system shown in FIG. 1.

FIG. 2 is a simplified diagram of an exemplary computer-based system 22 that can be used to implement the automated password reset system 10 shown in FIG. 1. Referring to the embodiment shown in FIG. 2, computer-based system 22 can include a process server 24, a data storage device 26, a main-frame computer 28, a plurality of work stations or desk-top computers 30, and a local file server 32.

Process server 24 may function to process password reset information 18 and command information received by system 10. A PYRAMID™ UNIX system, distributed by Hewlett Packard, has been successfully utilized as a process server 24. Data storage device 26 can be a mass storage subsystem of tapes and/or disk drives, which is electronically coupled to process server 24. In one embodiment, a relational database resides in data storage device 26. Consequently, process server 24 may retrieve, process, and store the information in the relational database residing in data storage device 26.

Main-frame computer 28 may be linked electronically to process server 24 through a local area network (LAN) or wide area network (WAN), for automated uploading and downloading of information therebetween. Any general purpose or medium-size computer, which includes a central processing unit (CPU) and suitable RAM, ROM, and I/O circuitry can be utilized for main-frame computer 28.

A first plurality of work stations 30 can be coupled to process server 24 by the same or a different LAN or WAN connecting main-frame computer 28. A user or security officer may input and receive password reset information 18 through any of work stations 30. Each work station 30 can be a "dumb terminal" or work station with emulation. Alternatively, each work station 30 may be a desk top computer having its own processor.

Local file server 32 may be linked electronically to process server 24 by the same or a different LAN or WAN, or by telecommunication lines through a modem (not specifically shown). Additionally, as shown (for illustrative purposes only) in FIG. 2, process server 24 can be linked by a "gateway" interface communications processor to local file server 32. Local file server 32 can be connected to a second plurality of work stations 30, which provide the same functionality as the first plurality of work stations 30 previously described.

The present invention contemplates that a user or a security officer can access system 10 through any of work stations 30, which can be situated at many different sites. Consequently, password reset information 18 can be collected at any site via a suitable work station 30. The password reset information can then be relayed to and stored in a centralized location, such as the relational database residing in data storage device 26. Because process server 24, main-frame computer 28, work stations 30, and local file server 32 are preferably linked to data storage device 26, each of these processing devices can directly access (e.g., store and retrieve) the information, if desired.

FIG. 3 is an exemplary question and answer input screen 34 that may be presented by system 10 to collect password reset information 18 from a user. Question and answer input screen 34 may comprise an input field 36 and a command field 38.

Input field 36 may comprise a plurality of input lines, such as question input lines 40a–40e, answer input lines 42a–42e, and verification input lines 44a–44e, onto which password reset information 18 can be entered. Each question input line 40 can receive a question formulated and keyed in by a user. Preferably, the user inputs personal questions, the answers to which are not generally available or commonly known. For example, as shown in FIG. 3, the following questions can be entered onto question input lines 40a–40e, respectively: "What is my mother's maiden name?"; "What was my first car?"; "What was my high school's mascot?"; "What is my favorite color?"; and "What is the diving speed of a laden swallow?"

Answer input lines 42a–42e correspond to question input lines 40a–40e, respectively. A user's answer to a question specified in a particular question input line 40 can be entered in the corresponding answer input line 42. In one embodiment, the user's answer is not displayed on question and answer input screen 34 as the user keys in the information. Consequently, other people who may be present at the time of input are not able to discern the user's answer from question and answer input screen 34. As mentioned before, the answer to each question is also formulated by the user and does not need to be factually correct. For example, a user may input "Lee" as an answer to the question displayed on question input line 40a when the maiden name of the user's mother is actually "Smith."

Each of verification input lines 44a–44e corresponds to one of answer input lines 42a–42e. Each verification input line 44 functions to receive a verification for the answer input into a corresponding answer input line 42. Preferably, the user's verification is not displayed on question and answer input screen 34 as the user keys in the information. If the verification entered on a verification input line 44 does not match the answer entered on the corresponding answer input line 42, question and answer input screen 34 preferably prompts a user to re-enter the answer and the verification. Consequently, if a user makes an error in keying in an answer, the incorrect answer is not stored as part of password reset information 18.

Command field 38 comprises information to assist a user in the entry of password reset information 18. This may include instructions to access help screens or menu screens, such as help instruction 46 and menu instruction 48. Command field 38 may also include an enter instruction 50 which directs a user to press the "ENTER" key after all of the input lines in input field 36 have been completed.

FIG. 4 illustrates an exemplary user verification screen 52 that may be generated by system 10 after the automated process for resetting a password has been invoked by a user. In one embodiment, after a user has entered his or her name or log-on ID, user verification screen 52 can be activated by the user when the user cannot remember his or her password. User verification screen 52 functions to verify the identity of the user so that system 10 can reset the user's password. User verification screen 52 may comprise a plurality of fields, such as an instructional field 54, an input field 56, and a command field 58.

Instructional field 54 comprises information directing a user on the process of user verification. As indicated by the exemplary instructional field 54 in FIG. 4, system 10 can be configured to require a user to correctly answer a predetermined number of the questions previously input by the user. If the user correctly answers at least the minimum number of questions, then system 10 allows the user to reset his or her password. On the other hand, if the user cannot correctly answer the minimum number of questions, the user's log-on ID is deactivated and further access to the automated password reset process is denied. The user then is required to contact a security officer in order to reset the password.

Input field 56 comprises an identification line 60, a prompting question line 62, and an answer input line 64. Identification line 60 may display the user's log-on ID or name. As stated before, a separate set of password reset information 18 comprising a plurality of questions and corresponding answers can be maintained for each user. System 10 retrieves the appropriate set of password reset information 18, preferably in response to the log-on ID or name previously entered by the user. Prompting question line 62 may display one of the retrieved questions. Answer input line 64 receives the user's answer to the question displayed on prompting question line 62.

Command field 58 may comprise an instruction line 66 directing a user to press the "ENTER" key after inputting an answer in input field 56. System 10 may then display another question on prompting question line 62. Preferably, the order and number of questions presented to a user is configurable.

The embodiment of the present invention illustrated and described with reference to FIG. 4 is exemplary only. It should be understood that system 10 can be configured in a number of alternate ways. For example, as shown in FIG. 4, a user must answer at least two questions correctly in order to reset the user's password. In other embodiments, however, the user may be required to answer all of the questions correctly. Likewise, although FIG. 4 illustrates an embodiment in which questions are presented on separate sequential screens, in other embodiments a plurality of questions may be presented simultaneously on one screen.

Figure 5:
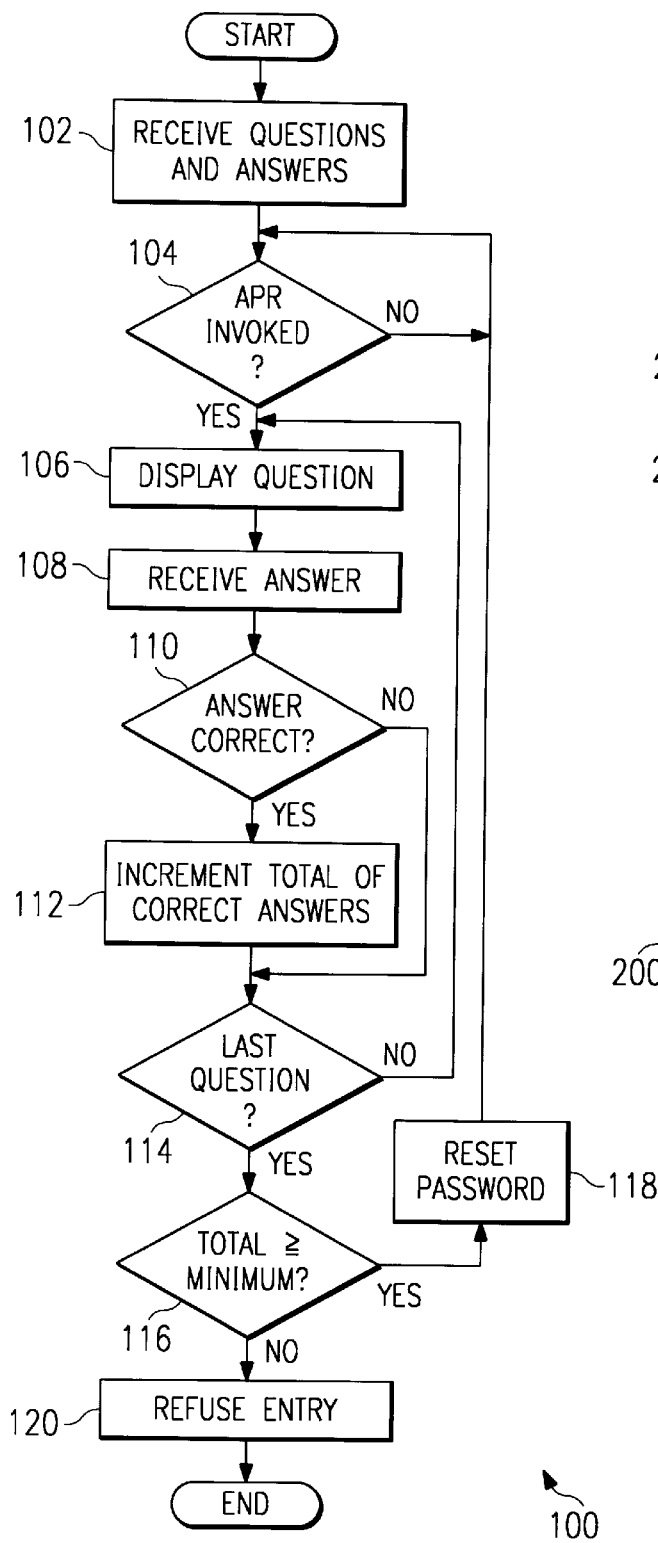
FIG. 5 is an exemplary flow chart of a method for automatically resetting a user's password according to an embodiment of the present invention.

FIG. 5 is an exemplary flow chart illustrating one embodiment of a method 100 for automatically resetting a password for a user of a computing system. Method 100 begins at step 102 where system 10, via a user interface 12, receives password reset information 18. Password reset information 18 may comprise a plurality of questions and corresponding answers formulated by various users. Preferably, a separate set of questions and answers are received for each user. Router 14 routes the password reset information 18 to password reset information memory 16 for storage. The process by which system 10 receives password reset information 18 is described below in more detail with reference to FIG. 6.

At step 104, system 10 determines whether the automated password reset process has been invoked. This process can be invoked when a user enters his or her name or log-on ID and attempts to access the computing environment, but cannot remember his or her password. If the automated password reset process has not been invoked, system 10 continues to monitor for an invocation of the process.

When the automated password reset process is invoked, router 14 of system 10 retrieves the set of questions and answers for the user specified by the log-on ID and, at step 106, displays at least one of the questions at a user interface 12. As described above, the presentation of the questions can be configured in a variety of ways, including presenting any portion or all of the questions simultaneously or individually.

For each question displayed at user interface 12, the user may input an answer. Router 14 receives the answer(s) at step 108. At step 110, router 14 compares the answer(s) input by the user against the corresponding answer(s) stored in password reset information memory 16. If the input answer(s) matches, at step 112, router 14 appropriately increments a total for the number of correct answers.

If the questions are being displayed one at a time, at step 114, router 14 determines whether the displayed question is the last question that should be presented to a user. If not, system 10 returns to step 106 where another question is displayed to the user. System 10 repeats steps 106–114 until a pre-configured number of questions has been displayed to a user and the user has responded accordingly.

At step 116, router 14 determines whether the total number of questions answered correctly by the user exceeds the predetermined minimum number of correct answers for resetting a password. If the total number of correct answers is greater than or equal to the predetermined minimum, system 10 resets the user's password at step 118. System 10 then returns to step 104 where it waits for the automated password reset process to be invoked.

Otherwise, system 10 deactivates the log-on ID and refuses entry to the user at step 120. In order for a user to further access the computing system at this point, the user must contact a security officer in order to have the security officer reactivate the log-on ID and reset the password. The security officer can access the password reset information 18, including the verification information comprising one or more questions and corresponding answers, via security interface 20, verify the user's identity, and then manually reset the password.

Figure 6:
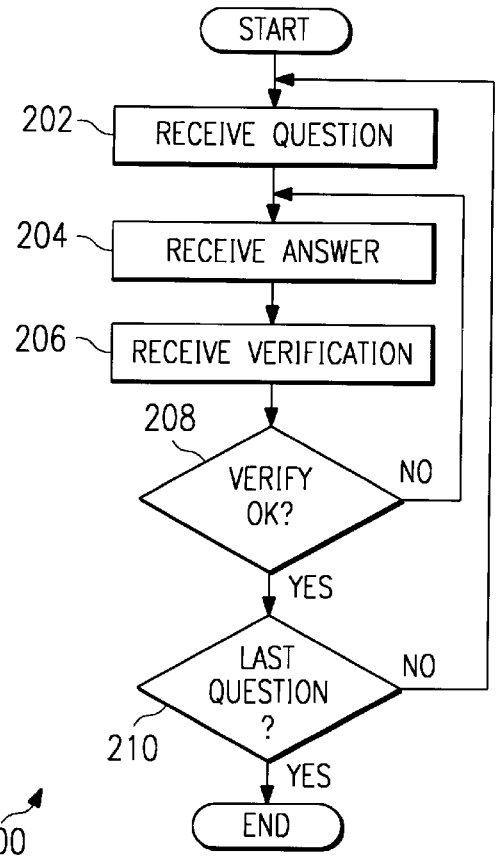
FIG. 6 is an exemplary flow chart of a method for receiving one or more questions and corresponding answers which can be used to verify a user's identity.

FIG. 6 is an exemplary flow chart of a method 200, corresponding to step 102 in FIG. 5, by which system 10 receives password reset information 18 from a user. Method 200 begins at step 202 where system 10 receives a question from the user at a user interface 12. The question is formulated by the user, and preferably is personal to the user.

System 10 then prompts the user to input an answer to the question. At step 204, system 10 receives the answer from the user at user interface 12. As noted before, the answer, which is also formulated by the user, does not have to be factually correct. System 10 may be configured so that the answer is not displayed on any input screen at the time of entry.

System 10 prompts a user to input a verification for the answer. At step 206, system 10 receives the verification. System 10 can be configured so that the verification is not displayed on any input screen when the verification is entered.

At step 208, system 10 determines whether the answer and the verification are the same. If not, the user has made a mistake in inputting either the answer or verification. Consequently, system 10 returns to step 204 where it prompts the user to input an answer for the current question.

If the verification and answer are the same, system 10 determines whether the current question is the last question that must be received from a user at step 210. The number of questions received from a user can be configurable. If the current question is not the last question, system 10 returns to step 202 where the next question is received from the user. The password reset information 18 is stored in password reset memory 16.

System 10 repeats steps 202–210 until password reset information 18, comprising a set of questions and corresponding answers formulated by the user, is received.

Although the present invention and its advantages have been described in detail, it should be understood that various changes, substitutions, and alterations can be made therein without departing from the spirit and scope of the invention as defined by the appended claims.

What is claimed is:

1. An automated method for resetting a computing system user's log-in password, comprising the steps of:

storing at least one question and corresponding answer received from a user, wherein said at least one question can be personal to the user and said corresponding answer can be factually incorrect;

graphically displaying the stored at least one question to the user in response to a request for a password reset, thereby prompting the user to input an answer to each such displayed question;

automatically determining whether each such input answer matches the stored corresponding answer; and automatically resetting the user's log-in password if each such input answer matches the stored corresponding answer.

2. The method of claim 1, wherein the step of graphically displaying the stored at least one question to the user further comprises the step of displaying the at least one question in a random sequence.

3. The method of claim 2, further comprising the step of determining whether the user has input a predetermined number of correct answers.

4. The method of claim 1, further comprising the step of displaying the stored question and corresponding answer to a security officer.

5. The method of claim 1, further comprising the step of receiving a verification for each such input answer.

6. The method of claim 1, further comprising the step of refusing access to the user if at least one input answer is not the same as the stored corresponding answer.

7. An automated method for resetting a computing system user's log-in password, comprising the steps of:

receiving a plurality of questions and corresponding answers from a user;

storing the questions and corresponding answers;

storing a log-on identification for the user;

receiving a password reset request from the user;

identifying the user based solely upon the stored log-on identification for the user;

graphically displaying at least one of the stored questions in response to the identity of the user, thereby prompting the user to input an answer to each such displayed question;

determining whether each such input answer matches the stored answer corresponding to the displayed at least one question;

determining whether the user has input at least a predetermined number of correct answers, and automatically resetting the user's log-in password if the user has input at least the predetermined number of correct answers.

8. The method of claim 7, wherein the step of graphically displaying at least one of the stored questions further comprises the step of displaying at least two of the stored questions in a random sequence.

9. The method of claim 7, wherein the step of graphically displaying at least one of the stored questions further comprises the step of displaying all of the stored questions.

10. The method of claim 7, wherein the step of receiving a plurality of questions and corresponding answers further comprises the step of receiving a verification for each corresponding answer.

11. The method of claim 10, further comprising the step of determining whether each such verification is the same as the corresponding answer.

12. An automated system for resetting a computing system user's log-in password, comprising:

a database operable to store at least one question and corresponding answer received from a user, wherein said at least one question can be personal to the user and said corresponding answer can be factually incorrect;

an interface operable to graphically display the stored at least one question in response to a request for password reset received from the user, thereby prompting the user to input an answer to each such displayed question; and a processor coupled to the database and the interface, the processor operable to determine whether each such input answer matches the stored corresponding answer, the processor further operable to automatically reset the user's log-in password if each such input answer matches the stored corresponding answer.

13. The system of claim 12, wherein the at least one question is displayed in a random sequence.

14. The system of claim 12, wherein the number of questions displayed to a user is configurable.

15. The system of claim 12, wherein the processor is further operable to determine whether the user has input a predetermined number of correct answers.

16. The system of claim 12, wherein the database is further operable to store a log-on identification for the user.

* * * * *

UNITED STATES PATENT AND TRADEMARK OFFICE
CERTIFICATE OF CORRECTION

PATENT NO.    : 5,991,882
DATED         : November 23, 1999
INVENTOR(S)   : Ellen R. O'Connell It is certified that error appears in the above-identified patent and that said Letters Patent is hereby corrected as shown below:

<u>Title page,</u>
Item [75], Inventor, delete "Ellen R. O'Connell" insert -- Harry Michael Foley --

Signed and Sealed this

Seventh Day of October, 2003

JAMES E. ROGAN
*Director of the United States Patent and Trademark Office*